(12) United States Patent
Brehob

(10) Patent No.: US 6,502,665 B1
(45) Date of Patent: Jan. 7, 2003

(54) DRIVE AXLE FOR MOTOR VEHICLE

(75) Inventor: Wayne M Brehob, Dearborn, MI (US)

(73) Assignee: General Motors Corporation, Detroit, MI (US)

(*) Notice: Subject to any disclaimer, the term of this patent is extended or adjusted under 35 U.S.C. 154(b) by 86 days.

(21) Appl. No.: 09/702,909

(22) Filed: Oct. 30, 2000

(51) Int. Cl.$^7$ ............................ F01M 11/02; F01M 9/06
(52) U.S. Cl. .................... 184/6.12; 184/11.2; 74/606 A
(58) Field of Search ............................ 184/6.12, 6.22, 184/11.2, 104.1, 81; 74/606 A, 607, 467; 675/160, 161, 230

(56) References Cited

U.S. PATENT DOCUMENTS

| | | | | |
|---|---|---|---|---|
| 1,950,034 A | * | 3/1934 | Mulford et al. | 184/13.1 |
| 4,736,821 A | * | 4/1988 | Ries | 74/606 A |
| 4,921,073 A | * | 5/1990 | Compton | 184/11.2 |
| 5,197,929 A | * | 3/1993 | Scheiber et al. | 475/160 |
| 5,341,900 A | * | 8/1994 | Hikes | 184/6.12 |
| 5,540,300 A | * | 7/1996 | Downs et al. | 184/104.1 |
| 6,098,441 A | * | 8/2000 | Hada et al. | 239/568 |
| 6,132,329 A | * | 10/2000 | Tison | 184/11.2 |
| 6,135,241 A | * | 10/2000 | Ganguly et al. | 184/11.1 |
| 6,206,140 B1 | * | 3/2001 | Craft et al. | 184/6.12 |
| 6,267,203 B1 | * | 7/2001 | Brissette et al. | 184/6.12 |

* cited by examiner

Primary Examiner—David A. Bucci
Assistant Examiner—Chong H. Kim
(74) Attorney, Agent, or Firm—Laura C. Hargitt

(57) ABSTRACT

A motor vehicle drive axle including a center housing, a pair of axle tubes, and a pair of axle bars in respective ones of the axle tubes. A gear assembly in the center housing includes a pinion shaft, a pinion gear on the pinion shaft, and a differential gear set. A pump driven by the pinion shaft has an inlet exposed to liquid lubricant in a pool in the center housing and a discharge connected to a pair of tubular spray bars in respective ones of the axle tubes. Each spray bar has a plurality of nozzles arrayed along its length aimed generally at the uppermost extremity of the inside surface of the corresponding axle tube. When the pinion shaft rotates, the pump pumps hot liquid lubricant into the spray bars at an elevated pressure and out of the spray bars through the nozzles as jets which impinge on the inside surfaces of the axle tubes near the uppermost extremities thereof. The hot liquid lubricant forms a film or coating over substantially 100% of the inside surfaces of the axle tubes as it drains back to the reservoir thereby to maximize the heat transfer performance of the axle tubes.

7 Claims, 2 Drawing Sheets

DRIVE AXLE FOR MOTOR VEHICLE

TECHNICAL FIELD

This invention relates to a motor vehicle drive axle.

BACKGROUND OF THE INVENTION

A common motor vehicle drive axle includes a center housing, a pair of axle tubes on opposite sides of the center housing, and a pair of axle bars rotatably supported on the drive axle in respective ones of the axle tubes. A gear assembly in the center housing includes a pinion gear connected to a propeller drive shaft of the motor vehicle and a differential gear set between the pinion gear and each of the axle bars. The differential gear set converts rotation of the pinion gear into rotation of the axle bars to drive respective ones of a pair of dirigible wheels on the outboard ends of the axle bars while permitting relative rotation between the axle bars when the motor vehicle turns. Heat attributable to friction in the gear assembly is transferred to liquid lubricant in a reservoir in the center housing and then to the air around the center housing through the wall of the center housing. Under severe operating conditions, e.g. towing, the heat transfer performance of the center housing may be inadequate and the temperature of the liquid lubricant may become excessive. To supplement the heat transfer performance of the center housing, it is known to adapt a ring gear of the differential gear set to push or scoop liquid lubricant from the reservoir into each of a pair of internal conduits in respective ones of the axle bars. The internal conduits transport the hot lubricant at low fluid pressure to the ends of the axle tubes where it drips onto the inside surfaces of the axle tubes. As the hot lubricant drains back to the center housing, it films or coats a relatively small fraction of the inside surfaces of the axle tubes. Since heat is transferred from the lubricant to the axle tubes through such lubricant films and since the filmed area is relatively limited, the supplemental heat transfer through the axle tubes may be inadequate to always maintain the temperature of the lubricant in a range consistent with long term durability of the gear assembly. Accordingly, manufactures continue to seek drive axles having improved heat transfer performance.

SUMMARY OF THE INVENTION

This invention is a new and improved motor vehicle drive axle including a center housing, a pair of axle tubes on opposite sides of the center housing, and a pair of axle bars rotatably supported on the drive axle in respective ones of the axle tubes. A gear assembly in the center housing includes a pinion shaft connected to a propeller drive shaft of the motor vehicle, a pinion gear on the pinion shaft, and a differential gear set between the pinion gear and each of the axle bars. A pump driven by the pinion shaft has an inlet exposed to liquid lubricant in a pool in the center housing and a discharge connected to a pair of tubular spray bars in respective ones of the axle tubes. Each spray bar has a plurality of orifices arrayed along its length constituting a corresponding plurality of nozzles aimed generally at the uppermost extremity of the inside surface of the corresponding axle tube. When the pinion shaft rotates, the pump pumps hot liquid lubricant into the spray bars at an elevated pressure and out of the spray bars through the nozzles as jets which impinge on the inside surfaces of the axle tubes near the uppermost extremities thereof. The hot liquid lubricant forms a film or coating over substantially 100% of the inside surfaces of the axle tubes as it drains back to the pool thereby to maximize the heat transfer performance of the axle tubes.

DESCRIPTION OF THE PREFERRED EMBODIMENT

Figure 1:
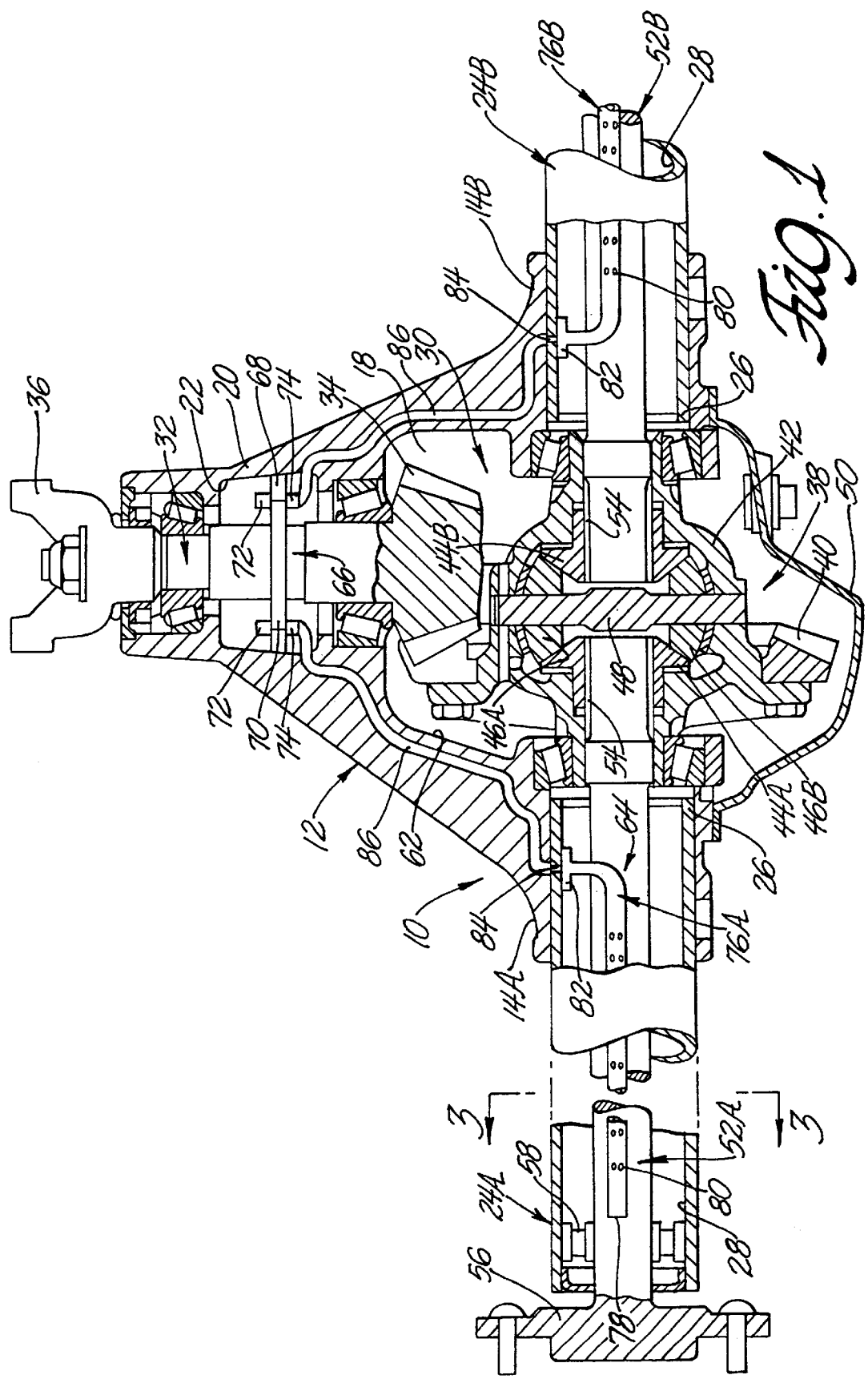
FIG. 1 is a fragmentary horizontal sectional view of a motor vehicle drive axle according to this invention.
Figure 2:
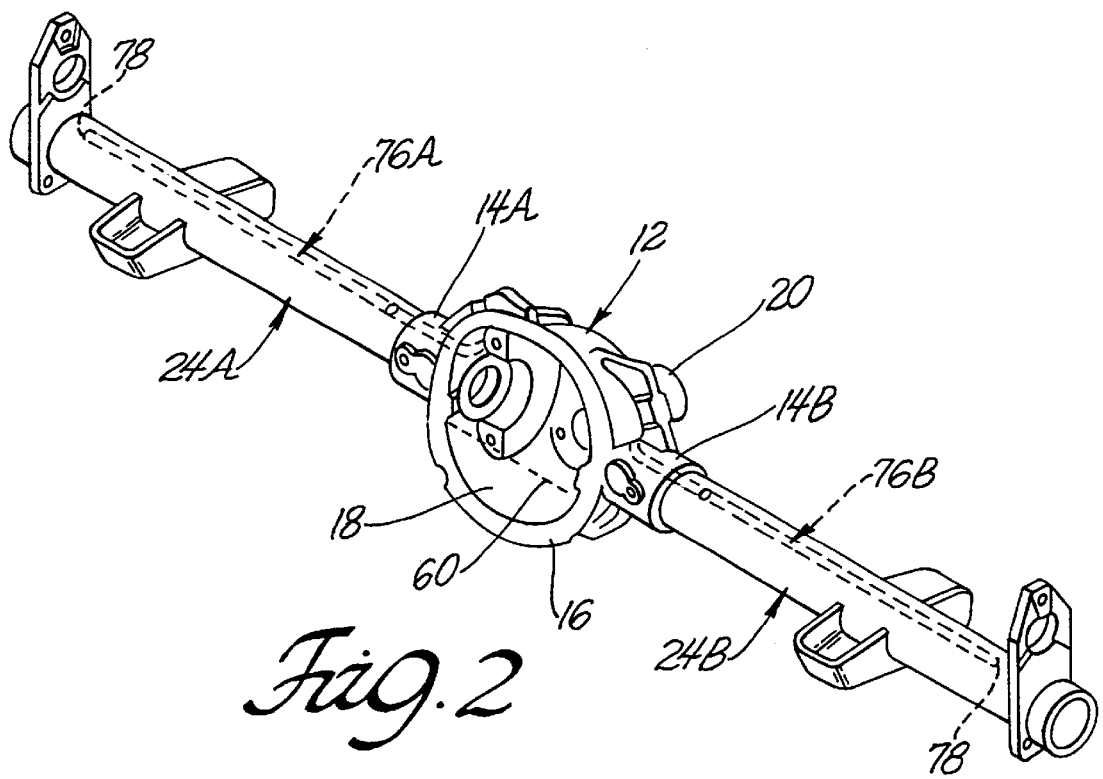
FIG. 2 is a fragmentary perspective view of the motor vehicle drive axle according to this invention.

Referring to FIGS. 1–2, a motor vehicle drive axle 10 according to this invention includes a center housing 12 having a pair of tubular bosses 14A,14B on opposite sides thereof, an open side 16 through which access is had to an internal chamber 18 of the center housing, and a pinion nose 20 having a passage 22 therein to the internal chamber. A pair of axle tubes 24A,24B are rigidly secured to the center housing 12 in respective ones of the tubular bosses 14A, 14B. Each axle tube has an open inboard end 26 and a cylindrical inside surface 28 exposed to the internal chamber 18 through its open inboard end.

As seen best in FIG. 1, a gear assembly 30 of the drive axle 10 includes a pinion shaft 32 rotatably supported on the center housing in the passage 22 in the pinion nose and a pinion gear 34 on an end of the pinion shaft in the internal chamber 18. A yoke 36 on the pinion shaft 32 outside of the center housing is adapted for connection to a propeller drive shaft, not shown, of the motor vehicle. A differential gear set 38 of the gear assembly 30 includes a ring gear 40 on a planet carrier 42 rotatably supported on the center housing in the internal chamber 18 and a pair of side gears 44A,44B rotatably supported on the planet carrier. The side gears mesh with a pair of planet pinions 46A,46B rotatably supported on a cross shaft 48 on the planet carrier. The pinion gear 34 meshes with the ring gear 40. A cover 50 over the open side 16 of the center housing closes the internal chamber 18.

The drive axle 10 further includes a pair of axle bars 52A,52B each having a plurality of splines 54 at an inboard end and a wheel flange 56 at an outboard end. The axle bars are disposed in respective ones of the axle tubes 24A,24B with their inboard ends united by the splines 54 with the side gears 44A,44B for unitary rotation with the side gears. Respective ones of a pair of wheel bearings 58 between the axle bars and the axle tubes cooperate with the side gears in rotatably supporting the axle bars on the drive axle. In conventional fashion, rotation of the pinion gear 34 by the propeller drive shaft rotates the axle bars 52A,52B together to drive dirigible wheels, not shown, connected to the axle bars at the wheel flanges 56 while the side gears and the planet pinions cooperate to permit the axle bars to rotate relative to each other when the motor vehicle turns.

The internal chamber 18 constitutes a reservoir in the center housing containing a schematically represented pool 60 of liquid lubricant, FIG. 2, in which the differential gear set 38 is partially submerged. The liquid lubricant reduces friction in the gear assembly and transfers heat from the gear assembly to an inside surface 62 of the center housing facing the internal chamber from which it is conducted to the atmosphere around the drive axle through the wall of the center housing.

The heat transfer performance of the center housing 12 is supplemented by a lubricant cooling system 64 of the drive axle including a schematically represented pump 66 in the passage 22 in the pinion nose. The pump may be a conventional crescent pump including a stator 68 rigidly attached to the center housing 12 and a rotor 70 rigidly attached to the pinion shaft 32 and cooperating with the stator in defining a pair of crescent-shaped pumping chambers, not shown. Each pumping chamber has an inlet 72 submerged in the pool 60 of liquid lubricant and a discharge 74.

Figure 3:
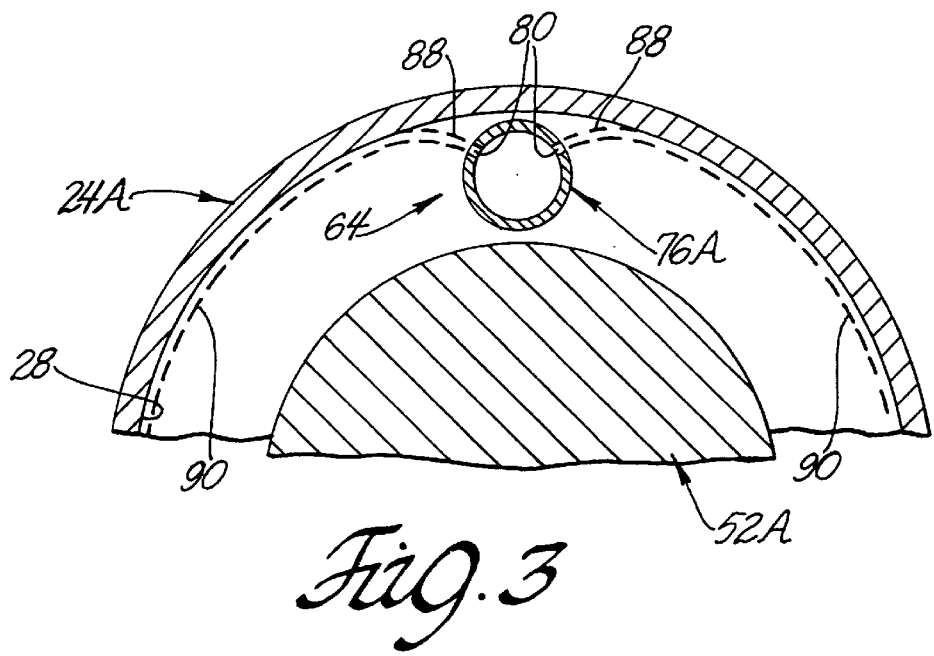
FIG. 3 is a fragmentary, enlarged sectional view taken generally along the plane indicated by lines 3—3 in FIG. 1.

A pair of tubular spray bars 76A,76B of the lubricant cooling system are suspended inside of respective ones of the axle tubes 24A,24B at the tops of the tubes and above corresponding ones of the axle bars 52A,52B, FIG. 3. Each spray bar 76A,76B spans substantially the full length of the corresponding axle tube and includes a closed outboard end 78 adjacent the corresponding wheel bearing 58, a plurality of orifices 80 arrayed along the length of the spray bar, and a schematically represented inboard end 82 sealed against the inside surface 28 of the corresponding axle tube over a radial passage 84 in the latter. The radial passages 84 communicate with the discharge ports 74 of the pump 66 through respective ones of a pair of cored passages 86 in the center housing 12 so that each of the spray bars is supplied with liquid lubricant at an elevated pressure when the pinion shaft 32 is rotated by the propeller drive shaft.

The orifices 80 constitute a plurality of nozzles on the spray bars aimed at substantially the uppermost extremities of the inside surfaces 28 of the axle tubes. Liquid lubricant at elevated pressure in the spray bars issues through the nozzles as a plurality of jets 88 which impinge on the inside surfaces of the axle tubes at substantially their uppermost extremities, FIG. 3. The liquid lubricant drains by gravity toward the diametrically opposite lowermost extremities of the inside surfaces of the axle tubes where streams form and drain by gravity back to the internal chamber 18 through the open inboard ends 26 of the axle tubes.

As the liquid lubricant drains by gravity along the inside surfaces 28 of the axle tubes from their uppermost extremities, films or coatings 90 form on substantially 100% of the inside surfaces. Heat is transferred from the liquid lubricant to the inside surfaces 28 of the axle tubes through the films of liquid lubricant and then to the atmosphere around the axle tubes through the walls of the axle tubes. The heat transfer performance of the axle tubes increases as the fraction of the inside surfaces 28 thereof which are filmed or coated with liquid lubricant increases. Therefore, since substantially 100% of the insides surfaces are filmed or coated, the heat transfer performance of the axle tubes is maximized so that the temperature of the liquid lubricant in the pool 60 is consistently maintained in a range corresponding to maximum durability of the drive axle.

While only a preferred embodiment of this invention has been described herein, it will be appreciated that other forms could be readily adapted by one skilled in the art. Accordingly, the scope of this invention is to be considered limited only by the following claims.

The embodiments of the invention in which an exclusive property or privilege is claimed are defined as follows.

What is claimed is:

1. A motor vehicle drive axle including
a center housing having therein an internal chamber,
a pool of liquid lubricant in the internal chamber,
a pair of axle tubes rigidly attached to the center housing on opposite sides thereof each having an inside surface exposed to the internal chamber in the center housing,
a gear assembly in the internal chamber in the center housing including a rotatable member, and
a cooling system for the liquid lubricant in the pool in the internal chamber,
characterized in that the lubricant cooling system comprises:
a pump driven by the rotatable member of the gear assembly having in inlet exposed to the pool of liquid lubricant in the internal chamber and a discharge,
a pair of tubular spray bars supported on the drive axle in respective ones of the axle tubes each having a closed outboard end and an open inboard end,
a conduit means operable to connect the discharge of the pump to the open inboard end of each of the pair of tubular spray bars so that the pump supplies liquid lubricant from the pool of liquid lubricant in the internal chamber to each of the pair of tubular spray bars at an elevated fluid pressure concurrent with rotation of the rotatable member of the gear assembly, and
a plurality of nozzles array ed along the length of each of the pair of spray bars aimed at generally the uppermost extremities of the inside surfaces of the axle tubes,
the liquid lubricant at elevated fluid pressure in each of the pair of spray bars issuing through the plurality of nozzles as jets of liquid lubricant which impinge on the uppermost extremities of the inside surfaces of the axle tubes and form films on substantially 100% of the inside surfaces for maximum heat transfer to the pair of axle tubes as the liquid lubricant drains by gravity toward the lowermost extremities of the inside surfaces of the pair of axle tubes.

2. The motor vehicle drive axle recited in claim 1 wherein: each of the pair of tubular spray bars is supported in a corresponding one of the pair of axle tubes at generally the upper most extremity of the inside surface thereof.

3. The motor vehicle drive axle recited in claim 2 wherein the conduit means comprises:
a pair of radial passages in respective ones of the axle tubes in fluid communication with the inboard end of the corresponding one of the tubular spray bars therein, and
a pair of cored passages in the center housing each having a first end in fluid communication with the discharge of the pump and a second end in fluid communication with a respective one of the pair of radial passages in the pair of axle tubes.

4. The motor vehicle drive axle recited in claim 3 wherein the rotatable member of the gear assembly comprises:
a pinion shaft rotatably supported on the center housing including a pinion gear meshing with a ring gear of the gear assembly.

5. The motor vehicle drive axle recited in claim 1 wherein: each of the plurality of nozzles in the pair of spray bars is constituted by an orifice in the corresponding one of the pair of spray bars.

6. A motor vehicle drive axle including
a center housing having therein an internal chamber,
a pool of liquid lubricant in the internal chamber,
a pair of axle tubes rigidly attached to the center housing on opposite sides thereof each having an inside surface exposed to the internal chamber in the center housing,
a gear assembly in the internal chamber in the center housing including a rotatable member, and
a cooling system for the liquid lubricant in the pool in the internal chamber, characterized in that the lubricant cooling system comprises: a crescent pump including a stator rigidly attached to the center housing and a rotor rigidly attached to and driven by the rotatable member of the gear assembly having an inlet exposed to the pool of liquid lubricant in the internal chamber and a discharge, a pair of tubular spray bars supported on the drive axle in respective ones of the axle tubes each having a closed outboard end and an open inboard end, a conduit means operable to connect the discharge of the pump to the open inboard end of each of the pair of tubular spray bars so that the pump supplies liquid lubricant from the pool of liquid lubricant in the internal chamber to each of the pair of tubular spray bars at an elevated fluid pressure concurrent with rotation of the rotatable member of the gear assembly, and a plurality of nozzles arrayed along the length of each of the pair of spray bars aimed at generally the uppermost extremities of the inside surfaces of the axle tubes, the liquid lubricant at elevated fluid pressure in each of the pair of spray bars issuing through the plurality of nozzles as jets of liquid lubricant which impinge on the uppermost extremities of the inside surfaces of the axle tubes and form films on substantially 100% of the inside surfaces for maximum heat transfer to the pair of axle tubes as the liquid lubricant drains by gravity toward the lowermost extremities of the inside surfaces of the pair of axle tubes.

7. The motor vehicle drive axle recited in claim 6:

wherein each of the pair of tubular spray bars is supported in a corresponding one of the pair of axle tubes at generally the uppermost extremity of the inside surface thereof, wherein the conduit means comprises a pair of radial passages in respective ones of the axle tubes in fluid communication with the inboard end of the corresponding one of the tubular spray bars therein, and a pair of cored passages in the center housing each having a first end in fluid communication with the discharge of the pump and a second end in fluid communication with a respective one of the pair of radial passages in the pair of axle tubes, wherein the rotatable member of the gear assembly comprises a pinion shaft rotatably supported on the center housing including a pinion gear meshing with a ring gear of the gear assembly, and each of the plurality of nozzles in the pair of spray bars is constituted by an orifice in the corresponding one of the pair of spray bars.

\* \* \* \* \*